(12) United States Patent
Maienschein et al.

(10) Patent No.: US 7,891,473 B2
(45) Date of Patent: Feb. 22, 2011

(54) TORQUE CONVERTER WITH FORCED OIL CIRCULATION

(75) Inventors: Stephan Maienschein, Baden-Baden (DE); Mario Degler, Baden-Baden (DE); Bruno Mueller, Sasbach (DE); Kai Sebastian Schenck, Offenburg (DE)

(73) Assignee: Schaeffer Technologies GmbH & Co., KG, Herzogenaurach (DE)

( * ) Notice: Subject to any disclaimer, the term of this patent is extended or adjusted under 35 U.S.C. 154(b) by 663 days.

(21) Appl. No.: 11/652,342

(22) Filed: Jan. 11, 2007

(65) Prior Publication Data

US 2007/0181396 A1 Aug. 9, 2007

Related U.S. Application Data

(60) Provisional application No. 60/758,302, filed on Jan. 12, 2006.

(30) Foreign Application Priority Data

Nov. 21, 2006 (DE) .................. 10 2006 055 229

(51) Int. Cl.
*F16H 45/02* (2006.01)
(52) U.S. Cl. .................. 192/3.3; 192/70.12; 192/85.61; 192/113.34
(58) Field of Classification Search ........................ None
See application file for complete search history.

(56) References Cited

U.S. PATENT DOCUMENTS

| | | | | |
|---|---|---|---|---|
| 5,735,376 A | * | 4/1998 | Moroto et al. | 192/113.34 |
| 5,964,329 A | | 10/1999 | Kawaguchi et al. | |
| 6,394,243 B1 | * | 5/2002 | Sasse | 192/3.29 |
| 7,036,643 B2 | | 5/2006 | Back et al. | 192/3.3 |
| 2004/0144607 A1 | * | 7/2004 | Back et al. | 192/3.3 |
| 2007/0235277 A1 | | 10/2007 | Heuler et al. | |

FOREIGN PATENT DOCUMENTS

| | | |
|---|---|---|
| DE | 101 04 346 A1 | 8/2002 |
| DE | 103 50 935 A1 | 5/2004 |
| EP | 1 843 062 A2 | 10/2007 |
| JP | 05126229 A | 5/1993 |
| JP | 2000088080 | 3/2000 |

* cited by examiner

*Primary Examiner*—Rodney H Bonck
(74) *Attorney, Agent, or Firm*—Davidson, Davidson & Kappell, LLC

(57) ABSTRACT

A three-channel torque converter in which an additional wall is mounted, thereby creating a third space which hydraulically connects the end of the plates that faces away from the turbine to a third channel. This third space ensures that an exchange flow of oil in a region of the hydrodynamic components (impeller, turbine, stator), of an optional damper, and of the lockup clutch is always restricted to flow across the plates of the lockup clutch. This provides high-performance cooling of the plates in the slip mode.

21 Claims, 8 Drawing Sheets

TORQUE CONVERTER WITH FORCED OIL CIRCULATION

Priority to U.S. Provisional Patent Application Ser. No. 60/758,302, filed Jan. 12, 2006, and to German Patent Application No. DE 10 2006 055 229.6, filed Nov. 21, 2006, is claimed, the entire disclosures of which are hereby incorporated by reference herein.

BACKGROUND INFORMATION

The present invention relates to a torque converter including a lockup clutch, said lockup clutch being equipped with at least two axially movable plates. The torque converter is further provided with a three-channel system. In order to optimize the flow of oil, and thus to improve the cooling of the plates, measures are taken to force the oil to flow across the plates.

From DE 103 50 935 A1, it is known that the oil flow across the plates of a torque converter lockup clutch can be optimized by suitable measures. To this end, the resistance to the flow of oil is increased in a region distant from the bypass. As a second, independent measure, the resistance to oil flow through the lockup clutch is reduced.

SUMMARY OF THE INVENTION

In accordance with an embodiment of the present invention, a torque converter for motor vehicles is provided which comprises a three-channel oil system and a lockup clutch, wherein the lockup clutch comprises at least two axially movable plates, at least one plate being non rotatably connected to an outer plate carrier and at least one other plate being non-rotatably connected to an inner plate carrier. A first channel of the oil system is connected to a first space. The first space preferably accommodates hydrodynamic components of the torque converter, such as an impeller, a turbine, and a stator. A second channel operates the lockup clutch by pressurizing a second space of the torque converter with oil, thereby pressing a piston against the plates. An additional wall spaced apart from the piston is mounted on a side of the piston that faces the first space, whereby a gap is formed between the piston and the additional wall, the additional wall abutting in a substantially oil-tight manner against the plate that faces the piston and at the same time providing hydraulic separation with respect to the first space and to the second space, thus forming a third space, which is connected in a substantially oil-tight manner to a third channel.

In accordance with yet another embodiment of the present invention, a torque converter for motor vehicles is provided which comprises a three-channel oil system, a lockup clutch, and an anti-rotation means provided for a piston in a pressure chamber between a housing and the piston, wherein the anti-rotation means is shaped as a disk and preferably takes the form of a diaphragm spring, the anti-rotation means being riveted to the housing, and ribs of the piston engaging with radially outer slots of the anti-rotation means.

In accordance with yet another embodiment of the present invention, a torque converter for motor vehicles is provided which comprises a three-channel oil system, a lockup clutch, and an anti-rotation means provided for a piston in a pressure chamber between a housing and the piston, wherein the anti-rotation means at the same time serves as a thrust washer (wear protection) between the housing and the transmission input shaft.

DETAILED DESCRIPTION

An object of the present invention is to further improve the flow of oil across the friction surfaces of the plates of a lockup clutch.

This objective is achieved in that the circulating oil flow in the region of the hydrodynamic components (impeller, turbine, stator) is restricted to flow in or out only across the plates of the lockup clutch. This is achieved by mounting an additional wall on the piston, this additional wall being mounted on the side of the piston that faces the plate pack, and thus forms the pressure chamber for the piston. The end of the additional wall that is close to the plate pack abuts in a substantially oil-tight manner against the surface of the adjacent plate. The end of the additional wall that is close to the transmission input shaft is connected to the transmission input shaft, also in a substantially oil-tight but rotatable manner.

In a first embodiment of the present invention, the outer toothing region at the outer plate carrier is closed in a substantially oil-tight manner at the end facing the turbine. Furthermore, a channel is disposed in the outer toothing region at the end facing away from the turbine, said channel substantially preventing inflow of oil from the region of the hydrodynamic components. Therefore, the circulating oil must always flow across the plates. It is true that when the lockup clutch is engaged, the oil cannot circulate without hindrance; however, in this condition, the torque is transmitted solely via the clutch. In other words, the impeller and the turbine rotate synchronously, as a result of which no work is generated there, and thus no friction.

In an embodiment of the present invention, when the lockup clutch is disengaged; i.e., when a large amount of heat is generated by the torus flow in the impeller, turbine, and stator, then circulation to and from the torque converter can take place to the full extent.

When the lockup clutch is in the slip mode, heat is generated mainly at the friction surfaces of the plates. In this condition, the system according to an embodiment of the present invention provides for optimum oil flow to cool the plates. In other words, the here-described forced oil circulation always ensures that the oil can exit the interior of the torque converter only after it has made its way across the friction surfaces of the plates.

In a second embodiment of the present invention, the outer toothing region at the outer plate carrier is not closed at the end facing the turbine. Instead, a sealing element is disposed in the region between the piston and the adjacent plate, said sealing element sealing the radial region between the outer diameter of the plate and axial bores through the plates.

Figure 1:
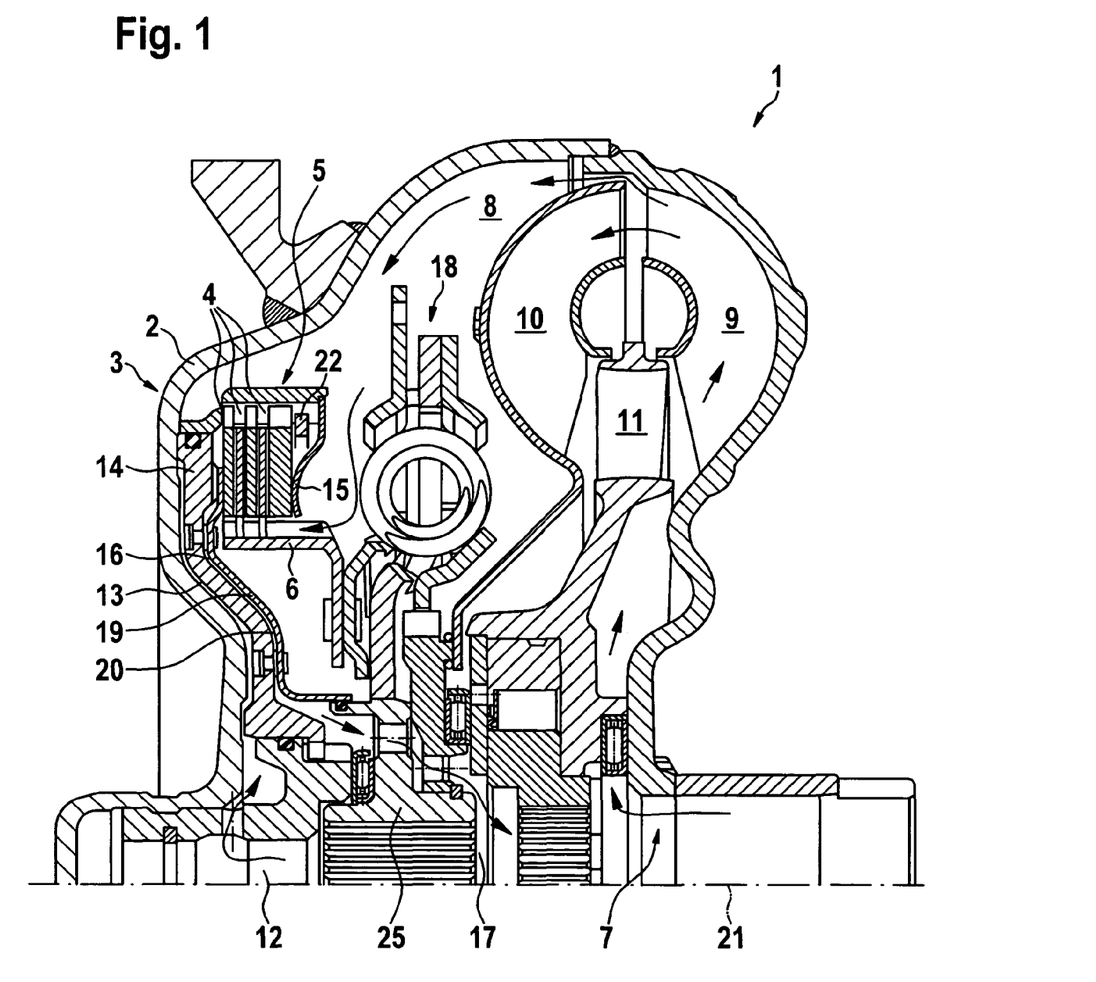
FIG. 1 is a half-sectional view of a torque converter according to an embodiment of the present invention in accordance with the first design approach.

FIG. 1 shows a torque converter 1, which rotates about an axis of rotation 21. Torque converter 1 contains in its housing 2 essentially an impeller 9, a turbine 10, a stator 11, and a lockup clutch 3. Moreover, a damper 18 is located in the power flow between lockup clutch 3 and a hub 25. The transmission input shaft and the torque support for stator 11 have been omitted in the drawing.

The torque converter is provided with a three-channel system; i.e., a total of three channels are available to accomplish circulation of oil and the control of lockup clutch 3. It is hereby understood that the oil flow for the circulation may have two directions. Thus, the direction shown in FIG. 1 is only meant to be illustrative, and not limiting. Initially, the oil flows into impeller 9 from a first channel 7, which is shown between the sleeve-shaped extension at the right end of the torque converter and the torque support (not shown) for stator 11. Then, part of the oil performs a continuation of the torus flow in turbine 10 and stator 11. The other part of the oil issues from the gap between impeller 9 and turbine 10, and pours into the remaining portion of first space 8.

A second channel 12 of torque converter 1, which leads out of the hollow transmission input shaft (not shown), feeds into a second space 13. When this space 13 is pressurized with oil, then lockup clutch 3 is engaged by a piston 14 moving to the right, thereby pressing plates 4 against an axial stop 22. However, when second space 13 is in an unpressurized or only slightly pressurized condition, the oil pressure from first space 8 causes disengagement.

Plates 4 have their teeth alternately engaged with the teeth of an outer plate carrier 5 or an inner plate carrier 6. In accordance with the present invention, outer plate carrier 5 is provided with a sealing element 15 at the end facing turbine 10. This sealing element 15 substantially prevents flow of oil between the teeth of outer plate carrier 5 and the teeth of the outwardly engaging plates 4, because it sealingly rests against the front-end edge of the outer plate carrier and against the right plate, called the end plate. In this exemplary embodiment, sealing element 15 is designed as an annular spring, but may also take the form of an annular disk in the context of the present invention, in which case the annular disk can at the same time serve as an axial stop 22. Sealing element 15 may be joined to outer plate carrier 5, to housing 2, or to an output part of a damper arranged radially outward, either by welding or crimping (a method similar to riveting).

The present invention further includes a third channel 17, which is connected to a space 16. This space 16 is formed, for example, by providing an additional wall 19 on piston 14 by means of spacer rivets 24. Gap 20 between piston 14 and additional wall 19 has an opening at the end of the outer toothing region that faces away from the turbine, said opening being capable of receiving the circulating oil. Since the additional wall provides a seal with respect to hub 25, it is impossible for oil to forcibly enter the return loop (=third channel) from first space 8. This ensures that oil can circulate substantially only across plates 4, i.e., across lockup clutch 3, thus optimizing the cooling of the friction linings of plates 4.

Figure 2:
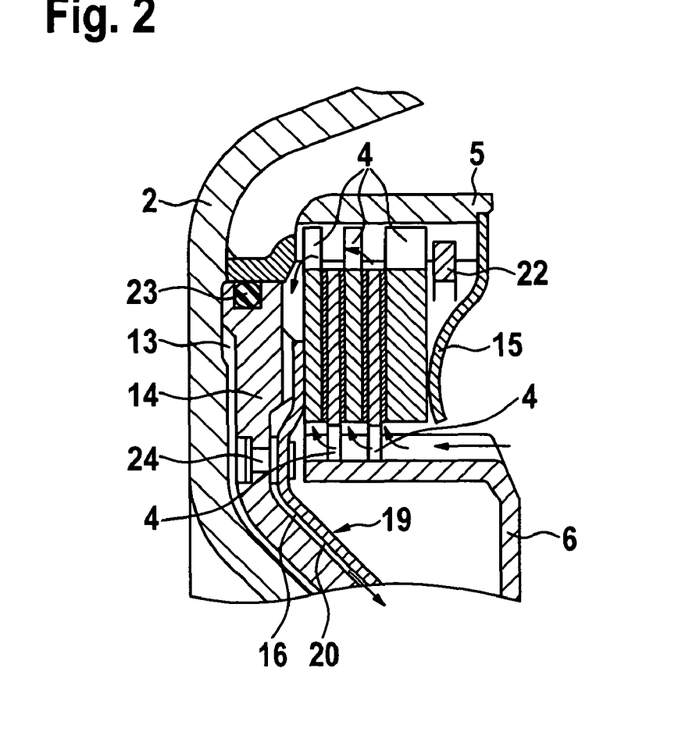
FIG. 2 is a detailed view of FIG. 1, showing the lockup clutch in a disengaged condition.
Figure 3:
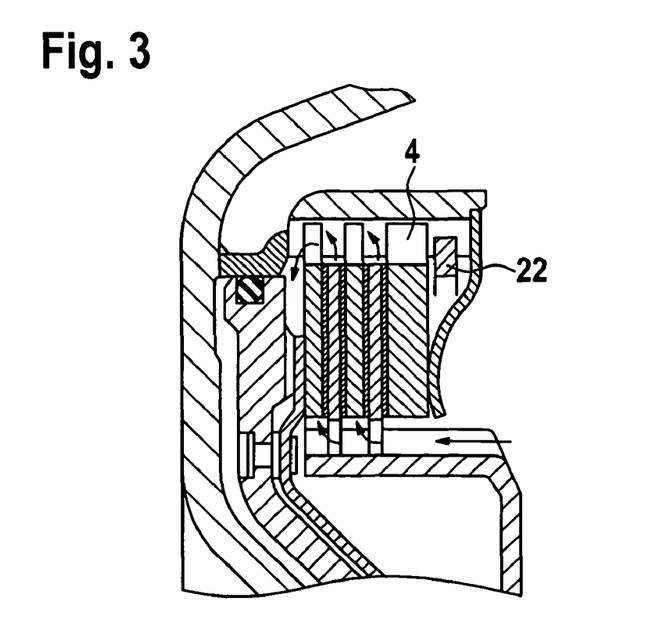
FIG. 3 is a detailed view of FIG. 1, showing the lockup clutch in an engaged or slipping condition.

FIGS. 2 and 3 illustrate in detail the flow of oil across plates 4. Referring to FIG. 2, it can be seen from the gap between axial stop 22 and the plate 4 adjacent thereto that the lockup clutch is not engaged here. Sealing element 15 is crimped radially outwardly to outer plate carrier 5. The radially inner end of sealing element 15 rests resiliently against the end plate, thus preventing inflow of oil in the outer toothing region. Therefore, the oil flows through the inner toothing region (i.e., between the teeth of the inner plate carrier and the plates 4 that are toothed on the radially inner side). Since it is impossible for the oil to flow off downward to the left (see FIG. 1 for the sealing point between additional wall 19 and the annular formation on hub 25), the oil can only flow in a radially outward direction. Once the oil has passed over the friction surfaces of plates 4 (the friction surfaces generally have oil grooves) and reached the outer toothing region, it can only flow off through the opening between the piston and additional wall 19. In order to prevent piston 14 from pressing the opening closed, the piston has noses 26 sequentially disposed in the peripheral region. These noses 26 rest against the surface of left plate 4. In the spaces between noses 26, the oil can flow off in an unobstructed manner.

FIG. 3 differs from FIG. 2 only in that here lockup clutch 3 is in an engaged condition. This is obvious from the reduced gap between axial stop 22 and adjacent plate 4. Here, the oil flow takes the same path as in FIG. 2, except that here the pressing together of plates 4 reduces the flow of oil, while the pressure in space 8 remains constant. However, this can only be compensated for by an increased pressure in space 8 during slipping. Independently of the approach of the embodiment of the present invention shown in FIG. 4, the illustrated arrangement of the piston differs from that shown in FIG. 1. In the embodiment of the present invention shown in FIG. 4, piston 14 is mounted on the transmission input shaft, and not on a so-called cover-mounted hub, as shown in FIG. 1. However, the design approaches of the present invention are independent of these variants.

Figure 4:
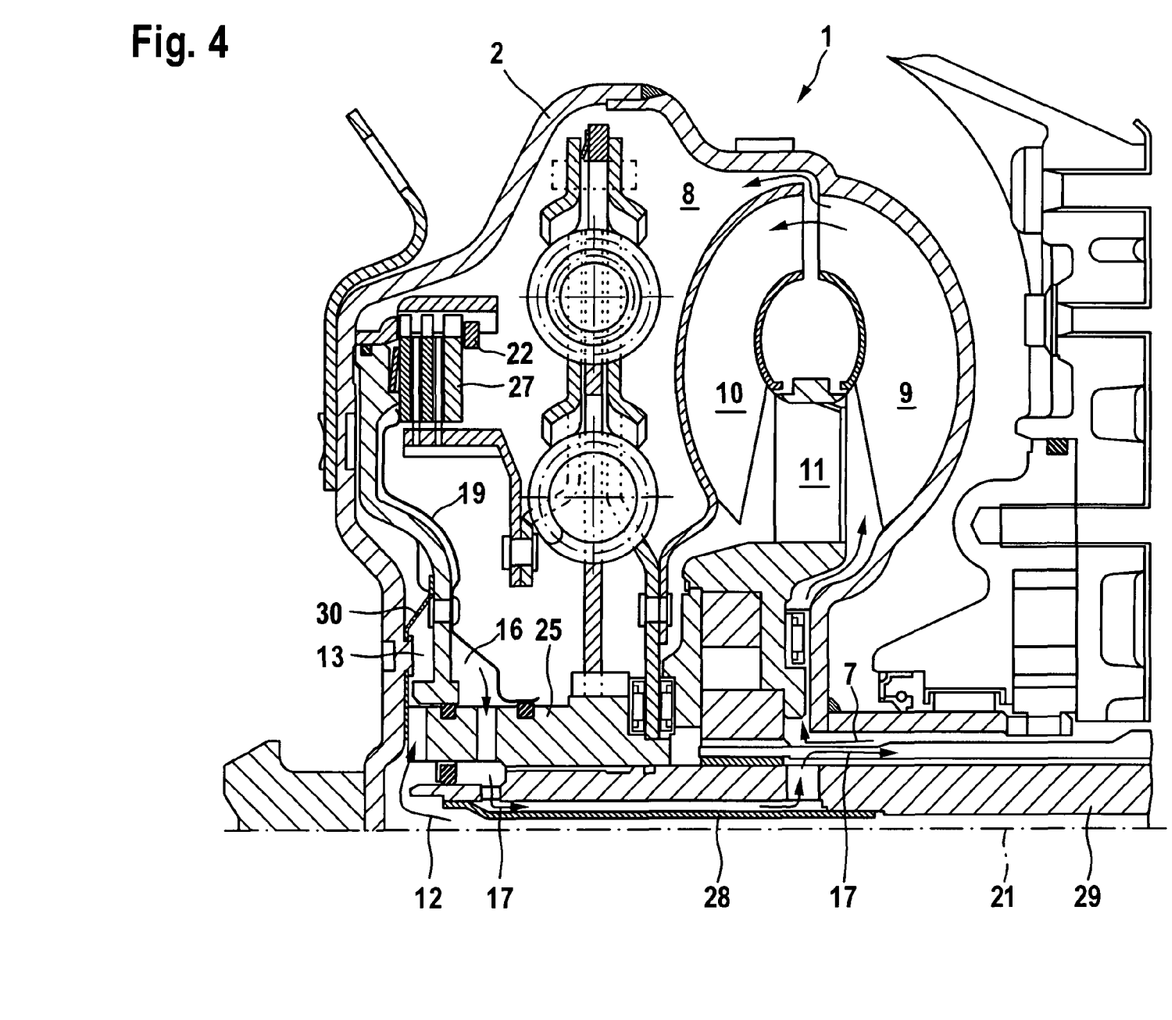
FIG. 4 is a half-sectional view of a torque converter in accordance with another embodiment of the invention according to the second design approach.
Figure 5:
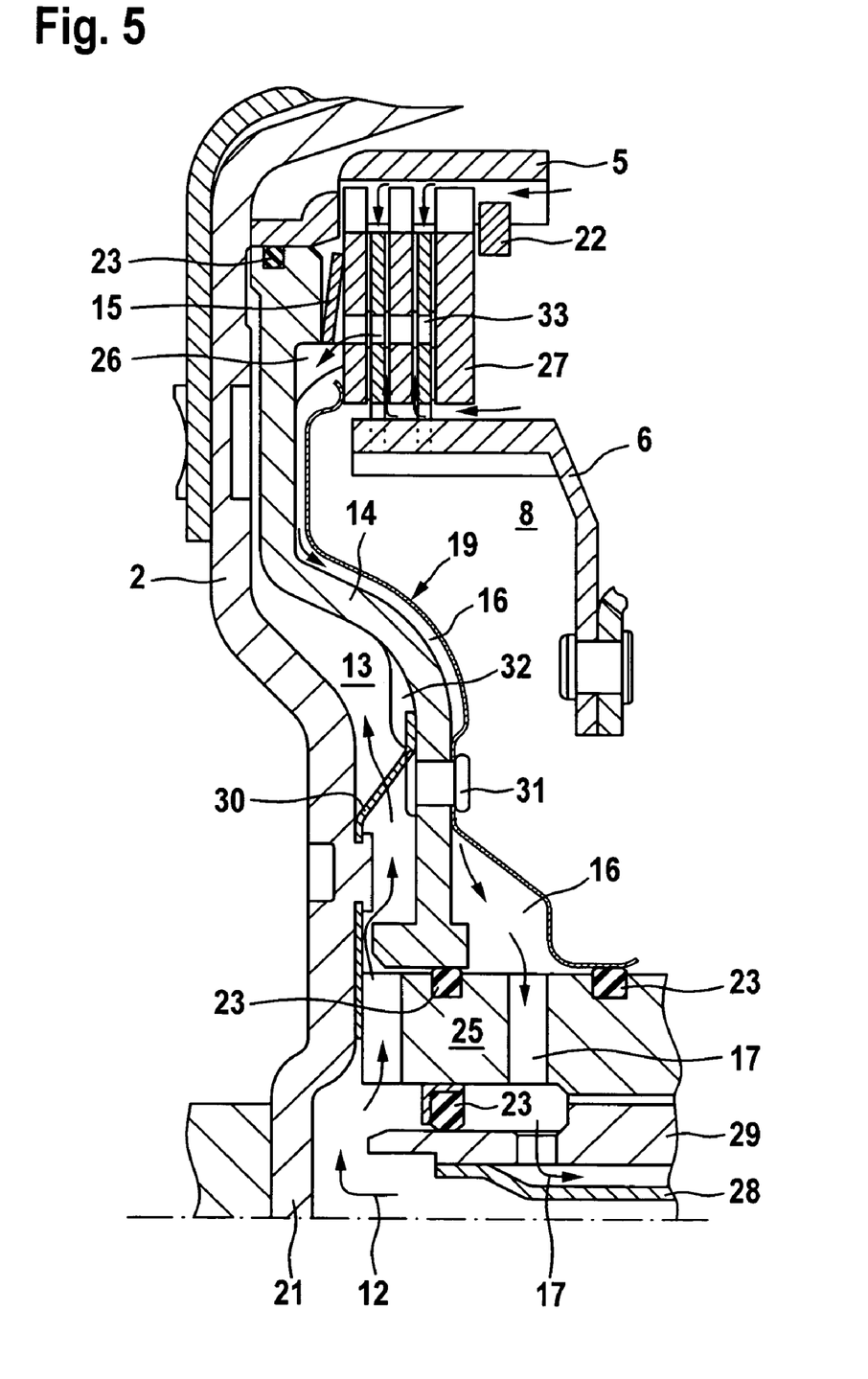
FIG. 5 is a detailed view of FIG. 4.

The second design approach of the present invention, which is illustrated in FIGS. 4 and 5, is that instead of sealing the outer toothing region at outer plate carrier 5, the radially outer region of the plate close to the piston is sealed to prevent oil from flowing off between the radially outer plate surface and the annular nose of the piston here. However, the plates are at the same time provided with at least one axial bore 33. When the pressure differences between first space 8 and third space 16 cause oil to flow into the toothing region between plates (4) and outer plate carrier 5 and/or plate carrier 6, then the oil can only flow in a radial direction in the gap between the friction linings and the surfaces of the plates that are not friction-lined, either with or without the assistance of oil grooves in the friction linings and/or steel plates. It should be particularly noted here that end plate 27, i.e., the plate that is closest to the turbine, does not have a bore extending therethrough, because otherwise no oil flow would be produced across the friction surfaces of the plates, as can be clearly seen from the Figures.

Bores 33 are preferably located in the radially middle region plates 4. Once the oil takes its path in the manner described above and reaches the bores, then the oil can flow axially toward piston 14. As clearly shown in FIG. 5, annular nose 26 of piston 14 is provided with openings allowing oil to flow off into third space 16.

Also shown in FIGS. 4 and 5 is an insertion sleeve 28, which routes third channel 17 around the toothing between hub 25 and transmission input shaft 29. This toothing region is manufactured to fit accurately, whereby passage of oil is made more difficult here. In the embodiment of the present invention shown in FIG. 1, this insertion sleeve is not needed because the oil flow is routed radially outside the hub/transmission input shaft toothing in a direction to the right; i.e., toward the transmission.

In the embodiments of the present invention illustrated in FIGS. 1 through 5, the oil may also flow in the opposite direction without departing from the idea of the present invention.

Yet another aspect of the present invention is illustrated in FIG. 5, which shows an anti-rotation means for piston 14. The anti-rotation means is riveted to the housing and provided with slots in the radially outer region. Ribs 32 are provided to engage with these slots.

Anti-rotation means 30 may be preferably designed as a diaphragm spring. A riveted connection could also be provided at the piston, and the connection provided by slots and corresponding ribs 32 could also be located at housing wall 2.

Another advantage of the illustrated anti-rotation means is, due to its radial extent toward transmission input shaft 29, anti-rotation means 30 also serves as a thrust washer; i.e., as an axial friction bearing means, between housing 2 and transmission input shaft 29.

Figure 6:
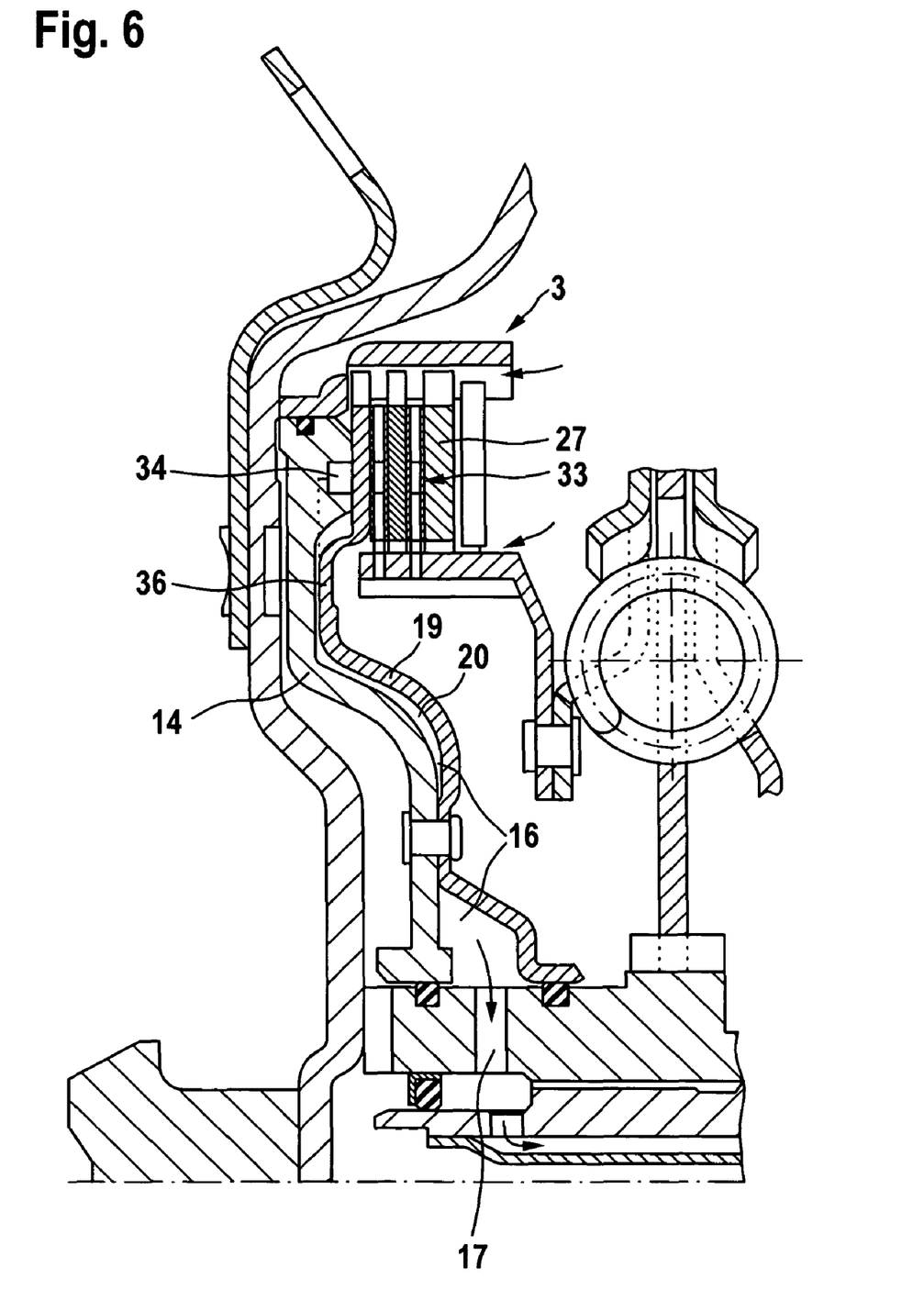
FIG. 6 is a half-sectional view in accordance with yet another embodiment of the invention according to the second design approach, showing an additional continuous wall.

In the embodiment of the present invention shown in FIG. 6, additional wall 19 is again sealingly connected to the plates. However, this embodiment has the special feature that additional wall 19 extends to the outer toothing region of lockup clutch 3 and at the same time rests flat against the adjacent plate. If the additional wall itself has teeth engaged with the toothing of the outer plate carrier, then anti-rotation means 30, as shown in FIGS. 4 and 5, is not necessary because piston 14 is also secured against rotation by the riveted connection 31 of additional wall 19 to piston 14.

In the example shown in FIG. 6, in order to allow the oil to flow through the plates via bore 33, additional wall 19 also has a bore in that region. In order to provide a hydraulic connection to third space 16, the piston may be provided with an opening 34. This opening 34 may include a blind-ended bore and a groove extending radially inwardly adjacent thereto (as shown in FIG. 6). However, an arch-shaped groove is also possible here, for example.

FIG. 6 further shows that a flexible connecting zone 36 may be provided between the radially outer and radially inner portions of additional wall 19 to provide elastic compliance between the plate pack and the position of the piston. This has been achieved, for example, by reducing the wall thickness in this region.

Figure 7:
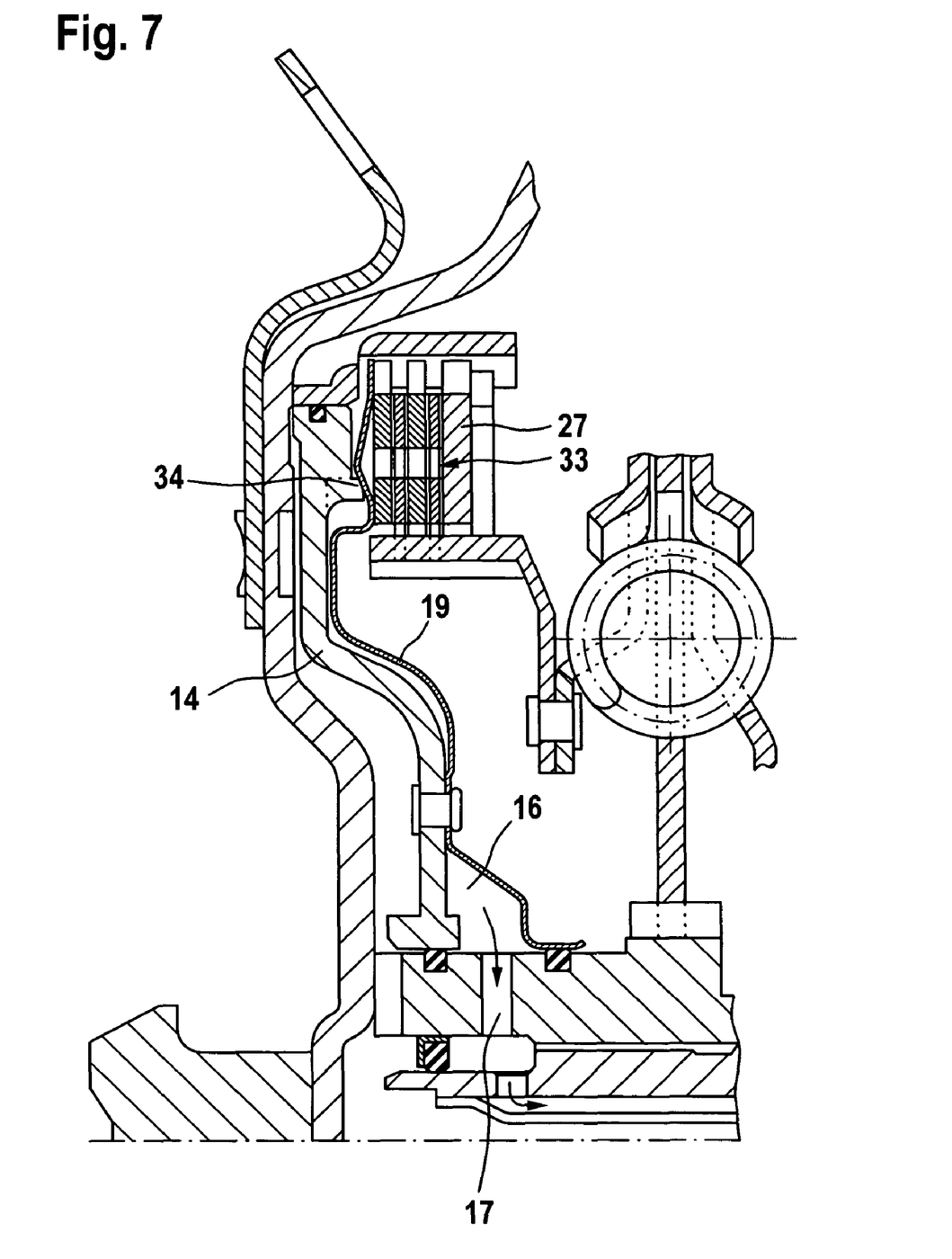
FIG. 7 is a half-sectional view of yet another embodiment of the present invention that is similar to the embodiment shown in FIG. 6, but shows the additional wall in the form of a spring member.

In the embodiment shown in FIG. 7, additional wall 19 takes the form of a disk-shaped spring member. This spring member seals the left plate by contact in both the radially outer and radially inner regions thereof. Due to the small wall thickness of additional wall 19, FIG. 7 does not show with clarity that, here, additional wall 19 is also provided with a bore through which the oil can flow into opening 34 and then into third space 16.

Figure 8:
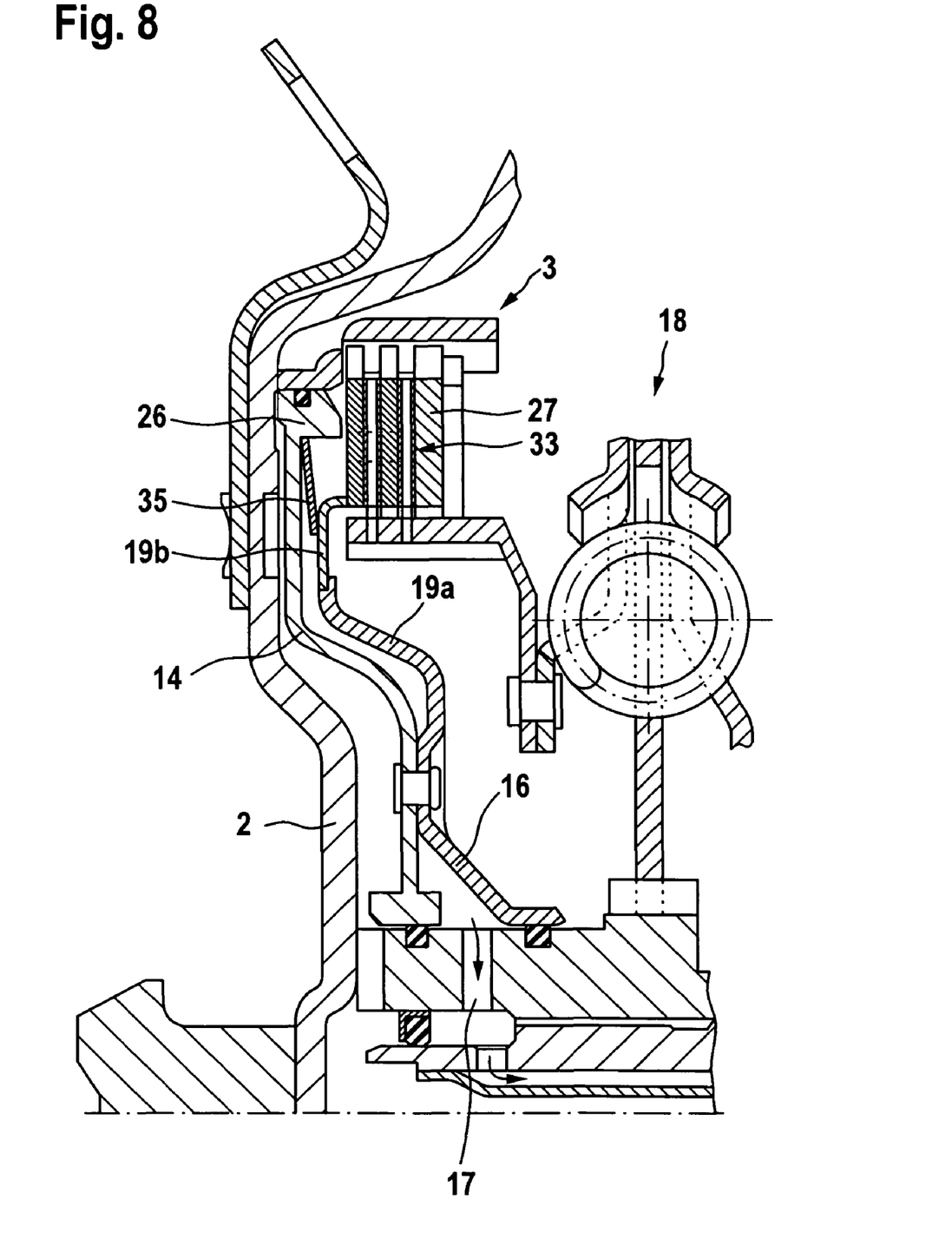
FIG. 8 is a half-sectional view of yet another embodiment of the present invention in accordance with the second design approach, but shows a two-part additional wall.

FIG. 8 illustrates another embodiment of additional wall 19 featuring a two-part design. Radially inner portion 19a of additional wall 19 has a greater wall thickness than radially outer portion 19b. Radially outer portion 19b is preferably elastic with pressure applied thereto by a spring force, such as by a diaphragm spring 35, for example. A diaphragm spring 35 is suitable because its partially radially slotted configuration allows the oil to flow off through its slots into third space 16.

When, in the exemplary embodiment shown in FIG. 8, piston 14 rests with its nose 26 against the left plate (that is, lockup clutch 3 is at least partially operated), then a defined positive outflow of the oil is provided by the also abutting additional wall 19b. In other words, the oil cannot flow out of space 8 without passing across the friction surfaces of the plates.

Figure 9:
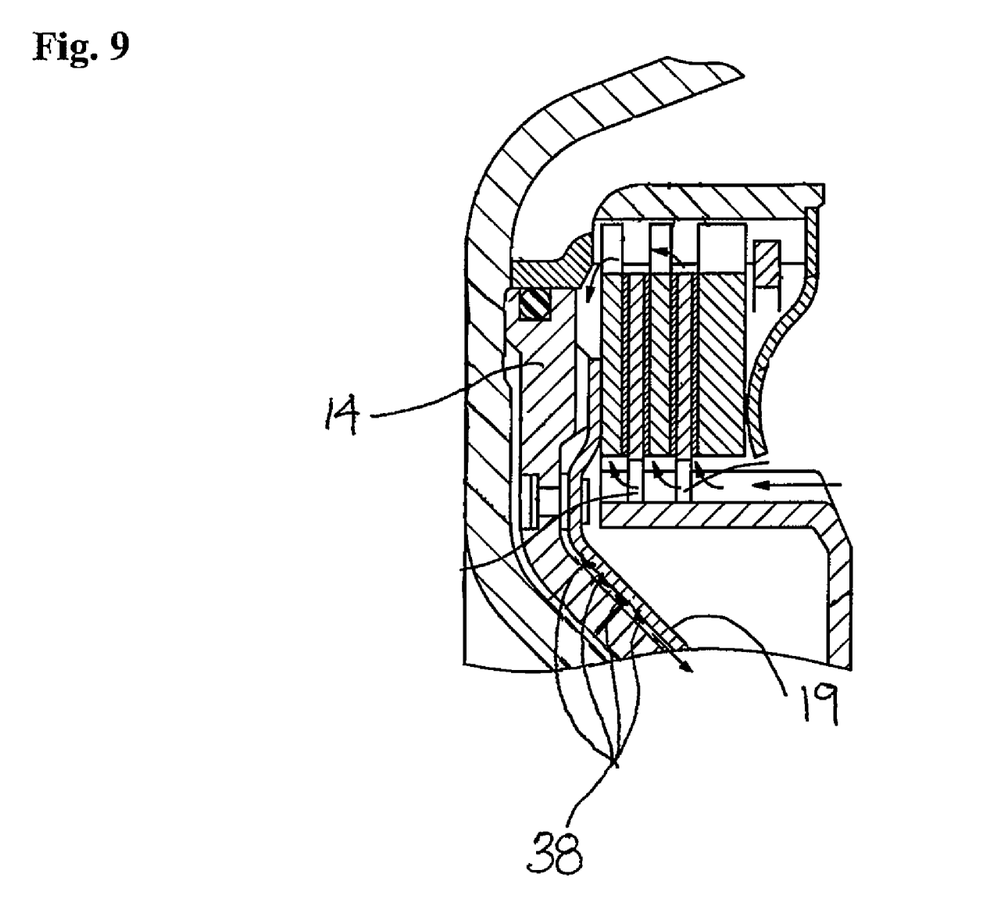
FIG. 9 is a detailed view of FIG. 1, where the additional wall has bumps.

FIG. 9 shows a detailed view of FIG. 1 showing the additional wall 19 having bumps 38. Bumps 38 are partially located on additional wall 19. When additional wall 19 and piston 14 are assembled together, bumps 38 rest against piston 14.

In order for radially outer portion 19b and radially inner portion 19a of additional wall 19 to remain sufficiently connected to ensure their function, regardless of current axial positions thereof, it is advantageous if the two parts are connected to one another, at least in a non-rotatable manner, for example, by shrinking, riveting or crimping. Sufficient tightness between radially outer portion 19b and radially inner portion 19a of additional wall 19 can be achieved, for example, by portion 19b being pressed against a shoulder of portion 19a, as shown in FIG. 8.

LIST OF REFERENCE NUMERALS 1 torque converter
2 torque converter housing
3 lockup clutch
4 plate
5 outer plate carrier
6 inner plate carrier
7 first channel
8 first space
9 impeller
10 turbine
11 stator
12 second channel
13 second space
14 piston
15 sealing element
16 third space
17 third channel
18 damper
19 additional wall
20 gap
21 axis of rotation
22 axial stop; retaining ring
23 seal
24 spacer rivet
25 hub
26 nose
27 end plate
28 insertion sleeve
29 transmission input shaft
30 anti-rotation means of the piston
31 riveted connection
32 rib
33 bore
34 opening in the piston
35 diaphragm spring
36 flexible connecting zone

What is claimed is:

1. A torque converter for motor vehicles comprising a three-channel oil system and a lockup clutch, wherein:
the lockup clutch includes at least two axially movable plates, at least one plate being non-rotatably connected to an outer plate carrier and at least one other plate being non-rotatably connected to an inner plate carrier;
a first channel of the oil system is connected to a first space;
a second channel operates the lockup clutch by pressurizing a second space of the torque converter with oil, thereby pressing a piston against the at least two axially moveable plates, one of the at least two axially moveable plates being closer to the piston and another of the at least two axially moveable plates being closer to the first space, the piston contacting the one of the at least two axially moveable plates being closer to the piston and moving the at least two axially movable plates in a direction away from the piston;

an additional wall spaced apart from the piston is mounted on a side of the piston that faces the first space, whereby a gap is formed between the piston and the additional wall, the additional wall abutting in a substantially oil-tight manner against the closer one to the piston of the at least two axially moveable plates and at the same time providing hydraulic separation with respect to the first space and to the second space, thus forming a third space;

the third space is connected in a substantially oil-tight manner to a third channel.

2. The torque converter as recited in claim 1 wherein the oil passes first through the first space and then through the third space.

3. The torque converter as recited in claim 1 wherein the oil passes first through the third space and then through the first space.

4. The torque converter as recited in claim 1 wherein at least one damper is disposed in the first space.

5. The torque converter as recited in claim 1 wherein a sealing element is disposed in such a manner that a flow of oil between the outer plate carrier and teeth of the closer one to the first space of the at least two axially moveable plates is reduced.

6. The torque converter as recited in claim 5 wherein the sealing element is designed as an annular spring.

7. The torque converter as recited in claim 5 wherein the sealing element is designed as an annular disk, the annular disk at the same time serving as an axial stop for the plates.

8. The torque converter as recited in claim 5 wherein the sealing element is connected to the outer plate carrier in an oil-tight manner.

9. The torque converter as recited in claim 5 wherein the sealing element is connected to a torque converter housing in an oil-tight manner.

10. The torque converter as recited in claim 5 wherein the sealing element is connected by welding.

11. The torque converter as recited in claim 5 wherein the sealing element is connected by crimping.

12. The torque converter as recited in claim 11 wherein the additional wall has bumps provided on part of the additional wall which, upon assembly with the piston, the bumps rest against the piston.

13. The torque converter as recited in claim 1 wherein the third space is provided by forming the piston with an opening allowing oil to flow between the plates and the third channel.

14. The torque converter as recited in claim 1 wherein the plates and friction linings disposed thereon are provided with at least one axially oriented bore, except for an end plate.

15. The torque converter as recited in claim 14 wherein the bore is located substantially at a middle diameter of the friction linings.

16. The torque converter as recited in claim 14 wherein a sealing element is disposed between the plate facing the piston and the piston in such a manner that a flow of oil between the piston and the plate facing the piston is at least reduced in a region between an outer diameter of the plate and the bore.

17. The torque converter as recited in claim 16 wherein the sealing element is in the form of a conical disk.

18. The torque converter as recited in claim 14 wherein the additional wall includes two subcomponents.

19. The torque converter as recited in claim 1 wherein the first space accommodates one or more hydrodynamic components of the torque converter.

20. The torque converter as recited in claim 19 wherein the one or more hydrodynamic components are selected from a group consisting of an impeller, a turbine and a stator, and combinations thereof.

21. A torque converter for motor vehicles comprising a three-channel oil system and a lockup clutch, wherein:

the lockup clutch includes at least two axially movable plates, at least one plate being non-rotatably connected to an outer plate carrier and at least one other plate being non-rotatably connected to an inner plate carrier;

a first channel of the oil system is connected to a first space;

a second channel operates the lockup clutch by pressurizing a second space of the torque converter with oil, thereby pressing a piston against the at least two axially moveable plates, one of the at least two axially moveable plates being closer to the piston and another of the at least two axially moveable plates being closer to the first space;

an additional wall spaced apart from the piston is mounted on a side of the piston that faces the first space, whereby a gap is formed between the piston and the additional wall, the additional wall continuously abutting in a substantially oil-tight manner against the closer one to the piston of the at least two axially moveable plates and at the same time providing hydraulic separation with respect to the first space and to the second space, thus forming a third space;

the third space is connected in a substantially oil-tight manner to a third channel.

* * * * *